(No Model.)
G. SEYFANG.
BICYCLE.
No. 540,762.  Patented June 11, 1895.
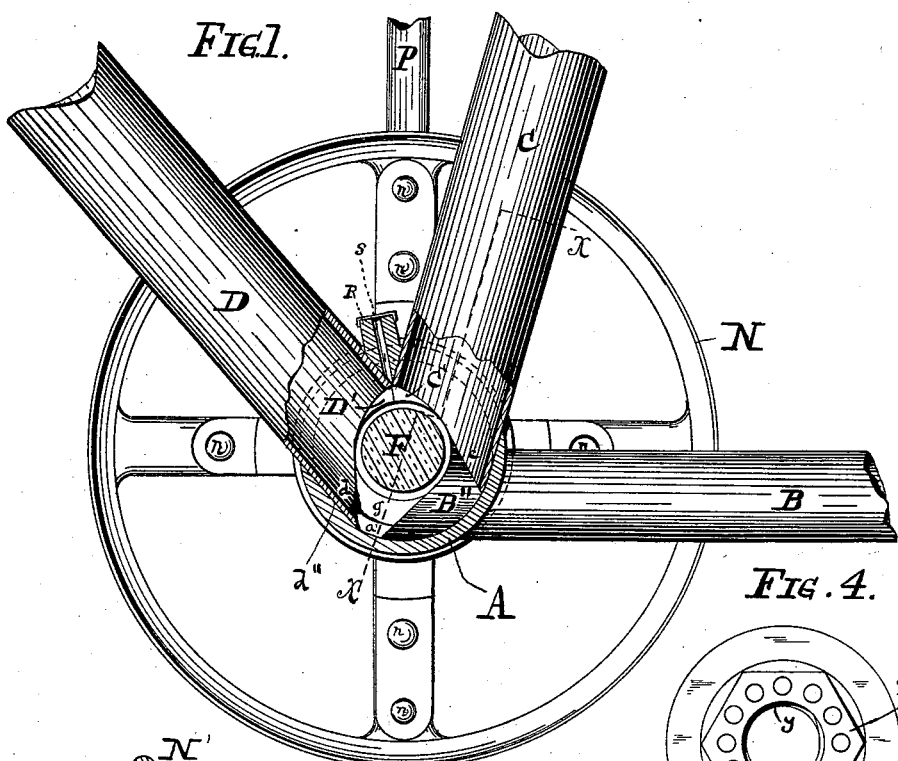
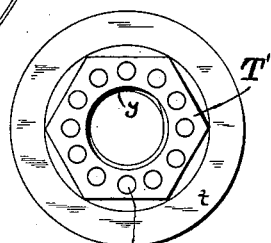
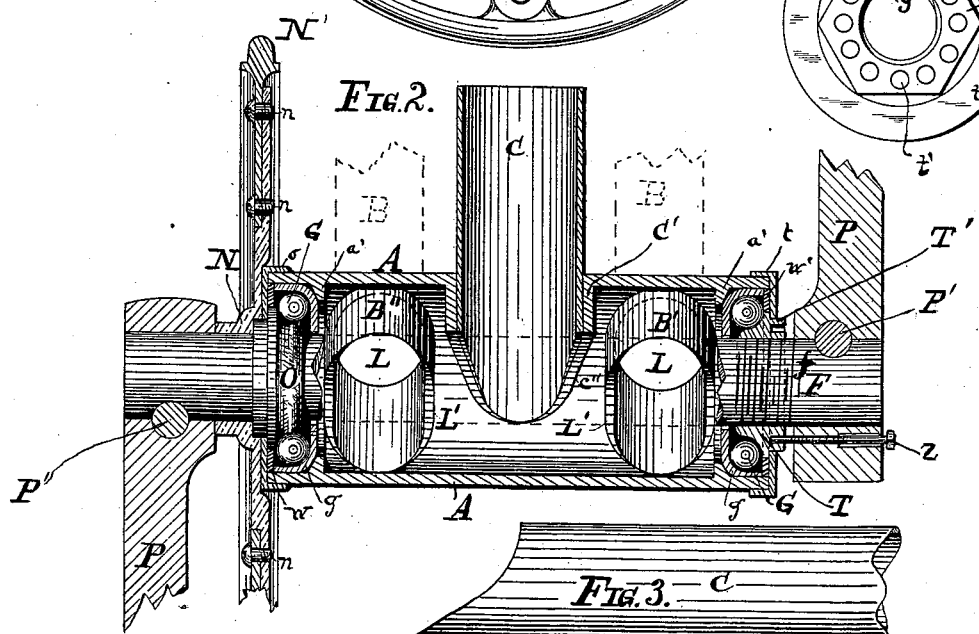
Witnesses:
Wm. H. Dopp
Centie S. Stark
Inventor:
George Seyfang.
by Michael J. Stark and Sons
Attorneys.

UNITED STATES PATENT OFFICE.

GEORGE SEYFANG, OF BUFFALO, NEW YORK.

BICYCLE.

SPECIFICATION forming part of Letters Patent No. 540,762, dated June 11, 1895.

Application filed March 14, 1895. Serial No. 541,697. (No model.)

*To all whom it may concern:*

Be it known that I, GEORGE SEYFANG, a citizen of the United States, residing at Buffalo, in the county of Erie and State of New York, have invented certain new and useful Improvements in Bicycles; and I do hereby declare that the following description of my said invention, taken in connection with the accompanying sheet of drawings, forms a full, clear, and exact specification, which will enable others skilled in the art to which it appertains to make and use the same.

This invention has general reference to improvements in bicycles; and it consists, essentially, in the novel and peculiar combination of parts and details of construction as hereinafter first fully set forth and described and then pointed out in the claims.

In the drawings already mentioned, which serve to illustrate my present invention more fully, Figure 1 is a sectional view of a crank-bracket, forward tube, and seat-post tube of a bicycle embodying my improvements. Fig. 2 is a sectional view taken in line $x$ $x$ of Fig. 1, some parts being broken away and others shown in elevation to better illustrate details of construction. Fig. 3 is an elevation of one of the tubes which projects into the crank-bracket, with its end cut away for the purpose hereinafter to be referred to. Fig. 4 is an end view of the ball-cone and dust-cap.

Like parts are designated by corresponding letters of reference in all the figures.

My improvements contemplate the production of a cheap, neat, and strong bracket for bicycles. In the past the proper construction and manufacture of a bracket that would not only be neat and serviceable but also be cheap, has been a desideratum, and in order to reach this result, I proceed to produce my bracket in the following manner, it being understood that the crank-bracket of a bicycle is that part which carries the pedal shaft, sprocket wheel and pedals. To this bracket are usually brazed the tube running forward to the head of the bicycle, the two tubes which extend to the rear for the rear wheel, and the one running upward to receive the seat post. At present projections or bosses are formed on the outside of the crank bracket over which these tubes are slipped, and to which they are brazed. Herein is where my improved crank bracket differs from those now in use.

The outside of my crank bracket is cylindrical in form and perfectly smooth without protuberances of any kind, save the one serving as an inlet for a lubricant. In the interior of the bracket, however, projections are formed, which are suitably bored out to receive the tubes aforesaid, and wherein they are brazed in position to make a perfect union with the bracket. This leaves the outside of the bracket perfectly smooth and susceptible of a high finish without much labor, a desideratum in the present manufacture of bicycles.

A, in the drawings represents my bracket, which is cylindrical in contour.

B is one of the tubes leading rearwardly to form the fork for the rear wheel.

C is one of the tubes leading upwardly to the saddle and saddle post, and D the tube extending forward to connect with the steering head of the bicycle.

Within the bracket A is formed an inwardly projecting boss $C'$, which is drilled to receive the tube C. This projection $C'$, it will be noticed, tapers downward to the inner wall of the bracket at $c''$, to permit the reception of the pedal shaft F. Directly opposite this projection, and in line with the same is formed another inwardly projecting protuberance $D'$, which is drilled to receive the forward bottom tube D. This boss also tapers away at $d''$, its lower end to admit the pedal shaft F heretofore mentioned. For the rearwardly extending tubes, which form the fork for the rear wheel, are provided two protuberances $B'$ $B''$, on the inside of the bracket. These, it will be noticed, are centrally drilled out, producing sockets L L, for the reception of the tubes B. By drilling as described the walls $L'$ are left to which the tubes are brazed.

The tubes C as well as the other tubes mentioned are beveled off as shown in Fig. 3, on the ends which enter these bosses so as to admit the entrance and reception of the pedal shaft F. It will be readily observed that if these tubes were left square or straight at the ends, no room within the bracket would be left for this shaft.

Near the end of the bracket, and on the interior wall thereof are formed annular ribs $a'$, to serve as shoulders for the ball cups $g$.

Centrally within the bracket is journaled the pedal shaft F. Near one end of this shaft is permanently fastened the ball cone O, between which and the ball cup $g$ a ball race is formed for the reception of hardened steel spheres or balls G, the whole combination of elements producing a journal commonly designated as a ball bearing. Closing the open end of the ball cup $g'$, and the ball race, and slipped over the shoulder on the cone O, is a washer $w$, placed there as a dust washer to prevent the entrance of grit into the ball race. This washer is held in position by a cap $o$, permanently fastened to the cone O and projecting over the outer end of the bracket A, so as to also act as a dust cap. Adjoining the cone O on the pedal shaft is fastened a sprocket spider N, having radially extending arms to which are fastened, by means of screws $n$, the inwardly projecting arms of the sprocket rim N'. This sprocket spider and rim, it is understood, are adapted to receive the usual chain by means of which the rear wheel of a bicycle is revolved, and thereby propelled along. The reason for making the sprocket wheel in two parts is to permit the attachment of rims of different diameters, so as to enable a change of gear whenever desired without disturbing the remaining parts of the mechanism.

Outside of the spider N on the pedal shaft F there is secured the usual pedal crank P by a key P'. At the end opposite this pedal crank is formed a screw thread $f$, over which is fitted a cone T, forming in connection with the ball cup $g$ a similar race way for the balls G, the same as the one on the opposite end of the shaft. A dust washer $w'$, closes the open end of the race, and is held in position by the dust cap $t$. On the rear end of this cone T is formed an hexagonal projection T', having a series of holes $t'$, in its face concentric with the screw thread $y$, Fig. 4, which is adapted to fit over the thread $f$ on the pedal shaft F. In these holes a screw Z passed through the hub of the crank P is arranged to fit and thereby to lock the cone T in any desired position. This latter arrangement is thus devised for the purpose of permitting adjustment of the ball bearings, and the operation thereof can be best described by specifying the mode of putting together the bearings. It is understood that the cone O and sprocket spider $n$ are immovably fastened to the shaft F. The first step is to drop the required number of balls into the cup $g$, the bracket having been brought to a vertical position for that purpose, and then to slip the shaft into the bracket. Now the balls are dropped into the opposite ball cup and the cone T screwed up until the balls are in contact with both, the cup and cone, on either end. The crank P is then fastened in position, and more delicate adjustment of the cone T, with a suitable wrench fitting over the hexagonal portion T' is made. When the bearings are just right the screw Z is screwed into one of the holes $t'$, to prevent the cone from turning. It is evident that further adjustment made necessary by reason of wear or other causes may be made at any time by simply withdrawing the screw Z and turning the cone until the retaining screw Z fits the next following hole $t'$.

To oil the interior of the bracket and bearings, I locate an oil hole R, with a cap, on the top of the bracket, as clearly shown in Fig. 1.

Having thus fully described my invention, I desire to secure to me by Letters Patent of the United States—

1. The improved crank bracket for bicycles hereinbefore described consisting of a tubular boss having in its interior hollow projections for the reception of the tubes forming the frame of the vehicle, said tubes being brazed within the projections, as set forth.

2. In a crank bracket for bicycles, a tubular boss having in its interior projections for the reception of the tubes composing the frame of the vehicle, said interior projections being beveled away at their free ends to permit the passage of the pedal shaft, as and for the object set forth.

3. In a crank bracket for bicycles, the combination, with the tubular boss having the interior projections beveled as described, of the tubes fitting said projections and having their ends beveled as set forth, said tubes being permanently secured within the projections in the manner as and for the object specified.

In testimony that I claim the foregoing as my invention I have hereunto set my hand in the presence of two subscribing witnesses.

GEORGE SEYFANG.

Attest:
MICHAEL J. STARK,
CENTIE S. STARK.